(12) United States Patent
Watai

(10) Patent No.: US 12,344,285 B2
(45) Date of Patent: Jul. 1, 2025

(54) IN-VEHICLE DEVICE

(71) Applicant: Mitsubishi Electric Corporation, Tokyo (JP)

(72) Inventor: Atsuki Watai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 551 days.

(21) Appl. No.: 17/770,101

(22) PCT Filed: Nov. 7, 2019

(86) PCT No.: PCT/JP2019/043623
§ 371 (c)(1),
(2) Date: Apr. 19, 2022

(87) PCT Pub. No.: WO2021/090430
PCT Pub. Date: May 14, 2021

(65) Prior Publication Data
US 2022/0389954 A1 Dec. 8, 2022

(51) Int. Cl.
*E05D 7/10* (2006.01)
*B61D 17/00* (2006.01)
*E05D 7/12* (2006.01)

(52) U.S. Cl.
CPC ........ *B61D 17/00* (2013.01); *E05D 2007/128* (2013.01)

(58) Field of Classification Search
CPC ....... E05D 7/10; E05D 7/1005; E05D 7/1016; E05D 7/1044; E05D 7/105; E05D 7/1022;
(Continued)

(56) References Cited

U.S. PATENT DOCUMENTS 3,889,992 A * 6/1975 Shelton ............... E05B 65/0014
292/87
4,378,948 A * 4/1983 Chrones ............. E05B 65/0014
292/76
(Continued)

FOREIGN PATENT DOCUMENTS

CN 207253260 U * 4/2018
DE 7013777 U 8/1970
(Continued)

OTHER PUBLICATIONS

Notice of Reasons for Refusal dated May 17, 2022, issued in corresponding Japanese Patent Application No. 2021-554493, 8 pages including 4 pages of English Translation.
(Continued)

*Primary Examiner* — Chuck Y Mah
(74) *Attorney, Agent, or Firm* — BUCHANAN, INGERSOLL & ROONEY PC

(57) ABSTRACT

An in-vehicle device includes a housing having an opening, an openable-closable cover disposed over the opening of the housing, a first member fixed to the cover to rotate about a rotational axis and including a protruding segment protruding in the direction of the rotational axis, and a second member fixed to the housing to support the first member such that the first member is rotatable about the rotational axis and including a notch to engage with the protruding segment around a point of intersection with the rotational axis. The edge of the notch has first and second surfaces intersecting with each other. The second member limits the rotation range of the first member to the range between the position in contact with the first surface and the position in contact with the second surface.

20 Claims, 21 Drawing Sheets

(58) Field of Classification Search
CPC .......... E05D 7/1055; E05D 2007/1027; E05D 2007/12; E05D 2007/126; E05D 2007/128; E05D 2007/105; E05D 2007/1061; E05D 2007/1066; E05D 16/266; E05D 16/267; E05D 16/268; E05D 16/271
See application file for complete search history.

(56) References Cited

U.S. PATENT DOCUMENTS

| | | | | |
|---|---|---|---|---|
| 4,715,628 | A * | 12/1987 | Brink | E05B 65/0014 292/87 |
| 4,717,184 | A * | 1/1988 | Boyce | E05B 65/0014 292/87 |
| 4,881,298 | A * | 11/1989 | Turnbull | E05D 7/105 296/147 |
| 5,008,975 | A * | 4/1991 | Wang | E05D 7/081 16/386 |
| 5,054,723 | A * | 10/1991 | Arnold | F16L 3/00 248/65 |
| 6,173,593 | B1 * | 1/2001 | Liermann | E05B 65/0014 70/333 A |
| 6,513,195 | B2 * | 2/2003 | Haase | B65D 43/164 220/832 |
| 9,267,261 | B2 * | 2/2016 | Royer | E02D 29/1418 |
| 9,470,027 | B2 * | 10/2016 | Ikemoto | B60R 11/0264 |
| 10,178,793 | B1 * | 1/2019 | Hsu | H05K 7/1488 |
| 2020/0002986 | A1 * | 1/2020 | Smith | E05D 11/06 |
| 2021/0086801 | A1 | 3/2021 | Watai | |

FOREIGN PATENT DOCUMENTS

| | | | | |
|---|---|---|---|---|
| EP | | 349752 | A * | 1/1990 .......... E02D 29/14 |
| JP | | S3930928 | Y1 | 10/1964 |
| JP | | H03125496 | A | 5/1991 |
| JP | | 2008038953 | A | 2/2008 |
| JP | | 2013185304 | A | 9/2013 |
| WO | | 2019180918 | A1 | 9/2019 |

OTHER PUBLICATIONS

Office Action dated Jul. 27, 2022, issued in corresponding German Patent Application No. 112019007873.9, 10 pages including 5 pages of English Translation.
Office Action issued in corresponding IN Application No. 202227024985, mailed on Nov. 9, 2022, 4 pages.
International Search Report (PCT/ISA/210) with translation mailed on Jan. 7, 2020 by the Japan Patent Office as the International Searching Authority for International Application No. PCT/JP2019/043623. (7 pages).
Written Opinion (PCT/ISA/237) with translation mailed on Jan. 7, 2020 by the Japan Patent Office as the International Searching Authority for International Application No. PCT/JP2019/043623. (11 pages).

* cited by examiner

IN-VEHICLE DEVICE

TECHNICAL FIELD

The present disclosure relates to an in-vehicle device.

BACKGROUND ART

Housings of in-vehicle devices installed in vehicles accommodate electronic equipment including power converters, circuit breakers, and transformers, for example. These housings are provided with openings that allow for inspection and maintenance of the internal electronic equipment. The openings are covered with covers that can be opened and closed so as to avoid failures of the internal electronic equipment. A typical example of vehicles including these types of covers is disclosed in Patent Literature 1.

CITATION LIST

Patent Literature

Patent Literature 1: Unexamined Japanese Patent Application Publication No. 2008-38953

SUMMARY OF INVENTION

Technical Problem

The vehicle body of a vehicle disclosed in Patent Literature 1 has an opening, which is covered with an openable and closable cover. The vehicle body is provided with a hinge device for opening and closing operations of the cover. The hinge device requires a rod-like shaft member serving as a rotational shaft. In order to prevent the shaft member from falling off, the fabrication process must involve swaging or welding, for example. The hinge device thus has a complicated structure and makes the fabrication process complicated.

An objective of the present disclosure, which has been accomplished in view of the above situations, is to provide an in-vehicle device having a simple structure for opening and closing operations of a cover.

Solution to Problem

In order to achieve the above objective, an in-vehicle device according to an aspect of the present disclosure includes a housing, a cover, a first member, and a second member. The housing has an opening. The cover is disposed over the opening and can be opened and closed. The first member is fixed to the cover, rotates about a rotational axis, and includes a protruding segment protruding in a direction of the rotational axis. The second member is fixed to the housing, supports the first member such that the first member is rotatable about the rotational axis, and has a notch to engage with the protruding segment around a point of intersection with the rotational axis. The edge of the notch has a first surface and a second surface intersecting with each other. The second member limits a rotation range of the first member about the rotational axis to a range between a position at which the first member is in contact with the first surface and a position at which the first member is in contact with the second surface.

Advantageous Effects of Invention

The in-vehicle device according to an aspect of the present disclosure includes the first member fixed to the openable and closable cover disposed over the opening of the housing and including the protruding segment protruding in the direction of the rotational axis, and the second member fixed to the housing, supporting the first member such that the first member is rotatable about the rotational axis, and having the notch to engage with the protruding segment around the point of intersection with the rotational axis. The second member limits the rotation range of the first member to the range between the position at which the first member is in contact with the first surface of the edge of the notch and the position at which the first member is in contact with the second surface of the edge of the notch. This in-vehicle device thus does not require a hinge device having a complicated structure and can achieve a simple structure for opening and closing operations of the cover.

DESCRIPTION OF EMBODIMENTS

Figure 1:
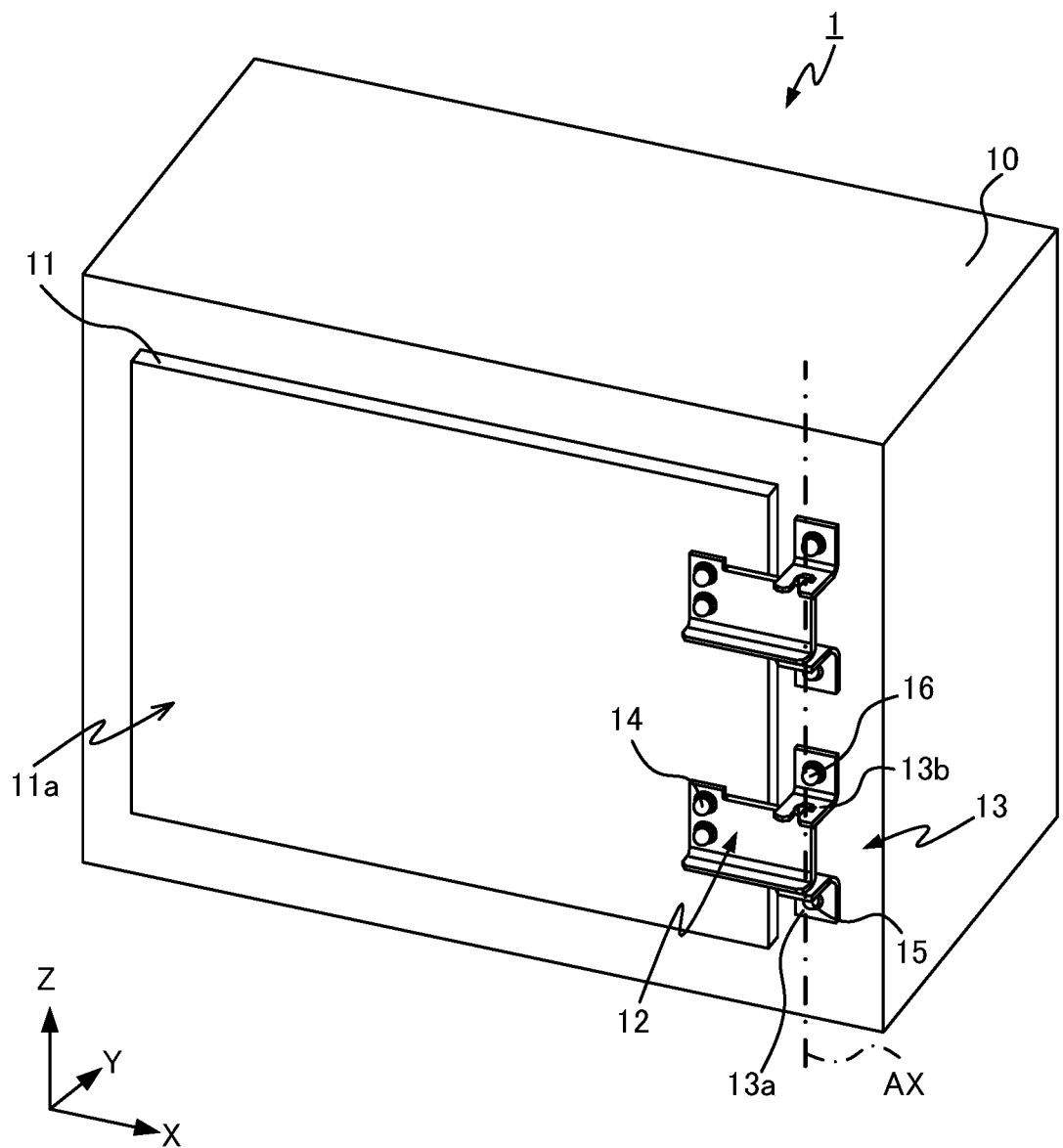
FIG. 1 is a perspective view of an in-vehicle device according to Embodiment 1 of the present disclosure.

An in-vehicle device according to embodiments of the present disclosure is described in detail below with reference to the accompanying drawings. In the drawings, the com-

Embodiment 1

A typical example of an in-vehicle device installed in a vehicle is a control device for a railway vehicle including a power converter, a circuit breaker, and a transformer, for example. An in-vehicle device 1 according to Embodiment 1 is described below focusing on an exemplary control device installed under the floor of a railway vehicle. As illustrated in FIG. 1, the in-vehicle device 1 includes a housing 10, an openable and closable cover 11 disposed over an opening provided to the housing 10, first members 12 fixed to the cover 11, and second members 13 fixed to the housing 10. The second members 13 support the first members 12 such that the first members 12 are rotatable, and each have a shape for limiting the rotation range of the first members 12. The in-vehicle device 1 includes two first members 12, and two second members 13 that support the respective first members 12 such that the first members 12 are rotatable. The two first members 12 have the identical configuration, and the two second members 13 have the identical configuration.

In FIG. 1, the Z axis indicates the vertical direction, the Y axis indicates the direction in which the opening extends through the housing 10, and the X axis extends in the horizontal direction along the surface provided with the opening of the housing 10. The X, Y, and Z axes are orthogonal to each other. The in-vehicle device 1 can achieve opening and closing operations of the cover 11 by means of only the first members 12 and the second members 13, without a hinge that requires a rod-like shaft member in an existing in-vehicle device, as is described in detail below. The in-vehicle device 1 thus has a structure for opening and closing operations of the cover 11 simpler than the existing structures including a hinge that requires a rod-like shaft member.

The housing 10 is fixed under the floor of a railway vehicle with fitting members, which are not illustrated. The housing 10 accommodates electronic equipment including a power converter, a circuit breaker, and a transformer, for example. The housing 10 has the opening, which allows for maintenance of the electronic equipment accommodated in the housing 10.

The cover 11 is disposed over the opening of the housing 10 and its circumference. The cover 11 is provided with the first members 12 fixed to a main surface 11a of the housing 10 that faces the outside. The first members 12 and the second members 13 enable the cover 11 to rotate about the rotational axis AX and thus be opened and closed, as is described in detail below. The rotational axis AX is represented by a dashed and single-dotted line in FIG. 1. The rotational axis AX extends in the Z-axis direction in Embodiment 1.

Figure 2:
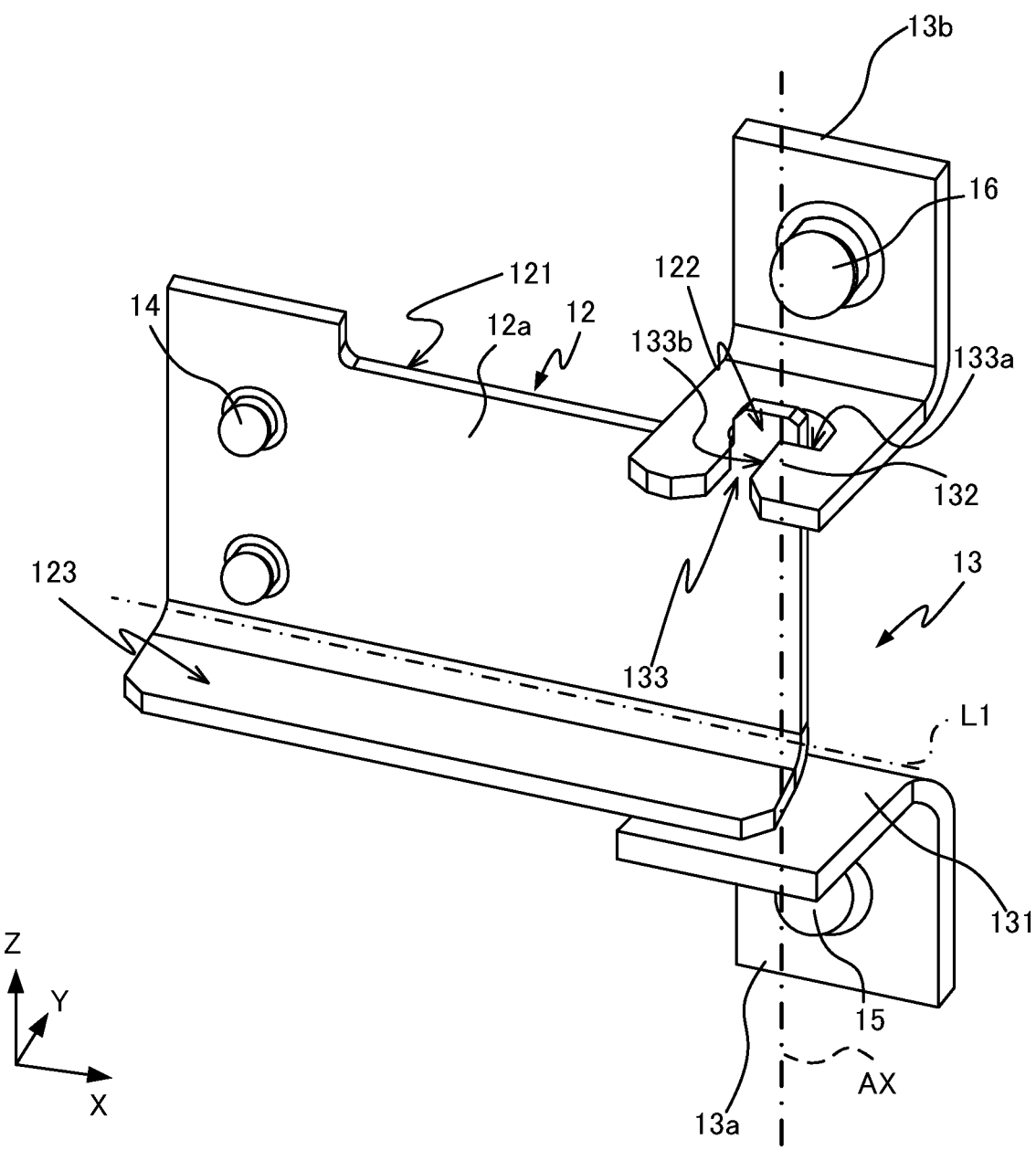
FIG. 2 is a perspective view of a first member and a second member according to Embodiment 1.

The first members 12 are fixed to the main surface 11a of the cover 11 with fasteners 14 and rotate about the rotational axis AX. The first members 12 preferably rotate while remaining in contact with the respective second members 13. As illustrated in FIG. 2, which is an enlarged view of each pair of the first members 12 and the second members 13 in FIG. 1, the first member 12 in Embodiment 1 includes a plate-like fitting segment 121 fixed to the main surface 11a of the cover 11, and a plate-like protruding segment 122 protruding in the direction of the rotational axis AX. The distal end of the protruding segment 122 is located above a notch 133 in the Z-axis direction, which is included in the second member 13 as is described below. The first member 12 rotates about the rotational axis AX while the protruding segment 122 is engaging with the notch 133 of the second member 13. The first member 12 rotates about the rotational axis AX between the position at which the first member 12 is in contact with a first surface 133a of the edge of the notch 133 and the position at which the first member 12 is in contact with a second surface 133b of the edge of the notch 133, as is described in detail below. The first member 12 has through holes to receive the respective fasteners 14 inserted therein. The fasteners 14 inserted in the through holes are fastened to the cover 11 and thus fix the first member 12 to the cover 11.

The first member 12 preferably includes the plate-like fitting segment 121 and the plate-like protruding segment 122.

The first member 12 preferably further includes an extending segment 123 that adjoins the fitting segment 121 and extends in a direction away from the main surface 11a of the cover 11. In this case, the second member 13 abuts on the lower surface in the vertical direction of the extending segment 123 and thereby supports the first member 12. In Embodiment 1, the extending segment 123 of the first member 12 has a main surface orthogonal to the rotational axis AX.

As illustrated in FIG. 2, each of the first members 12 is made of a metal plate 12a bent along a bending line L1 in Embodiment 1. In detail, the metal plate 12a is made of stainless-steel or iron, for example, and is bent at a right angle. The portion of the metal plate 12a in contact with the cover 11 serves as the fitting segment 121, while the portion of the metal plate 12a protruding in the direction of the rotational axis AX serves as the protruding segment 122. The portion of the metal plate 12a protruding from the fitting segment 121 in a direction intersecting the bending line L1 serves as the extending segment 123.

Each of the second members 13 includes a first-member supporting segment 131 to support the first member 12, and a rotation-range limiting segment 132 having the notch 133 to engage with the protruding segment 122 of the first member 12.

The first-member supporting segment 131 abuts on the lower surface in the vertical direction of the extending segment 123 of the first member 12 and thereby supports the first member 12.

The rotation-range limiting segment 132 has the notch 133 to engage with the protruding segment 122 around a point of intersection with the rotational axis AX. The notch 133 is engageable with the protruding segment 122, and has a shape for limiting the rotation range of the first member 12 that rotates while the protruding segment 122 is engaging with the notch 133.

In detail, the notch 133 has a width larger than the thickness of the protruding segment 122 and smaller than the width of the protruding segment 122. The thickness of the protruding segment 122 indicates the length in the Y-axis direction of the protruding segment 122 when the cover 11 is closed as illustrated in FIG. 2. The width of the protruding segment 122 indicates the length in the X-axis direction of the protruding segment 122 when the cover 11 is closed as illustrated in FIG. 2.

The edge of the notch 133 has the first surface 133a and the second surface 133b intersecting with each other. This structure limits the rotation range of the first member 12 to the range between the position at which the first member 12 is in contact with the first surface 133a and the position at which the first member 12 is in contact with the second surface 133b.

For example, the notch 133 is shaped so as to extend toward the positive side in the Y-axis direction and then extend toward the positive side in the X-axis direction in the XY plane. The edge of the notch 133 has the first surface 133a extending in the X-axis direction and the second surface 133b extending in the Y-axis direction. In detail, the first surface 133a is orthogonal to the second surface 133b. This structure limits the rotation range of the first member 12 to the range of 90° between the position at which the main surface of the first member 12 is parallel to the X axis and the position at which the main surface of the first member 12 is parallel to the Y axis. The edge of the notch 133 partially has an arc shape in the XY plane so as not to inhibit the rotation of the first member 12.

The second member 13 preferably includes a pair of plate members at least partially opposed to each other in the direction of the rotational axis AX. In this case, one of the pair of plate members corresponds to the first-member supporting segment 131, and the other of the pair of plate members corresponds to the rotation-range limiting segment 132.

In Embodiment 1, the second member 13 is made of a pair of metal plates 13a and 13b arranged in the Z-axis direction, as illustrated in FIG. 1. The metal plate 13a located at a lower position in the Z-axis direction is bent and fastened to the housing 10 with a fastener 15. The portion of the metal plate 13a extending in a direction away from the housing 10 abuts on the lower surface in the vertical direction of the first member 12 and serves as the first-member supporting segment 131 to support the first member 12. The metal plate 13b located at an upper position in the Z-axis direction is bent and fastened to the housing 10 with a fastener 16. The portion of the metal plate 13b extending in a direction away from the housing 10 serves as the rotation-range limiting segment 132.

The second member 13 preferably limits displacement of the first member 12 in the direction of the rotational axis AX. In an exemplary case where the first member 12 is located apart from the second surface 133b, the lower surface in the Z-axis direction of the rotation-range limiting segment 132 preferably abuts on the first member 12 and thereby limits displacement of the first member 12 in the direction of the rotational axis AX, specifically, displacement toward the positive side in the Z-axis direction. In addition, the upper surface of the first-member supporting segment 131 preferably abuts on the first member 12 and thereby limits displacement of the first member 12 in the direction of the rotational axis AX, specifically, displacement toward the negative side in the Z-axis direction.

The following description is directed to opening and closing operations of the cover 11 of the in-vehicle device 1 having the above-described structure.

Figure 3:
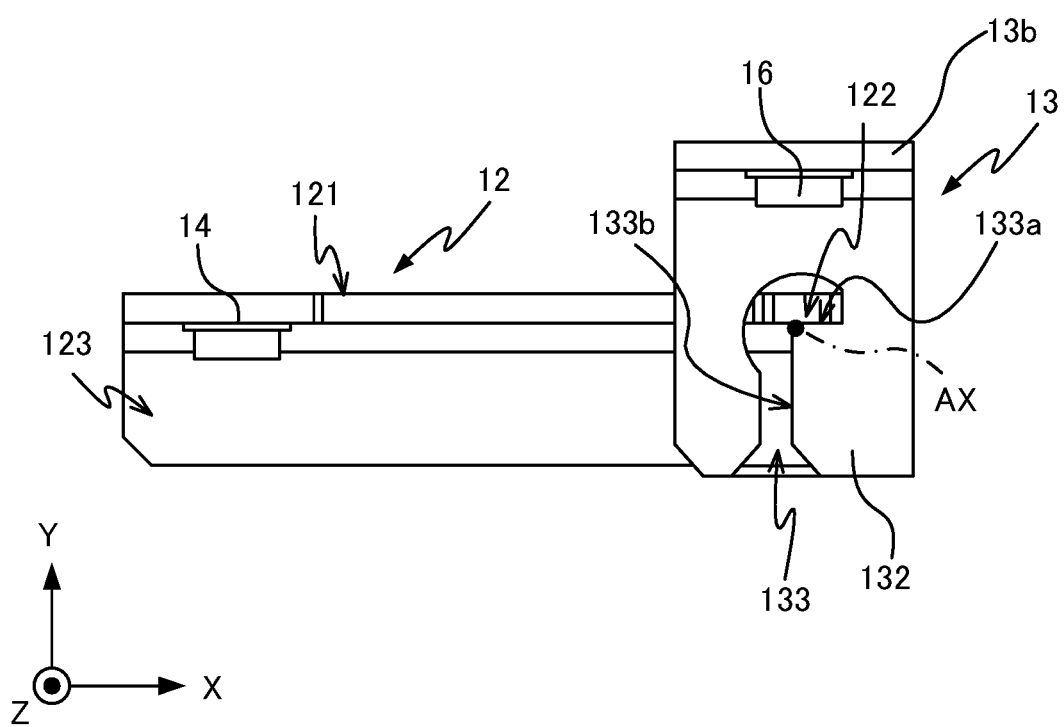
FIG. 3 is a top view illustrating rotation of the first member according to Embodiment 1.

FIGS. 1 and 2 illustrate a state when the cover 11 is closed. FIG. 3 illustrates the first member 12 and the second member 13 in this state as viewed toward the negative side in the Z-axis direction. FIG. 3 does not illustrate the housing 10 or the cover 11 in order to remain simple. While the cover 11 is closed, the first member 12 is in contact with the first surface 133a of the edge of the notch 133 extending in the X-axis direction.

Figure 4:
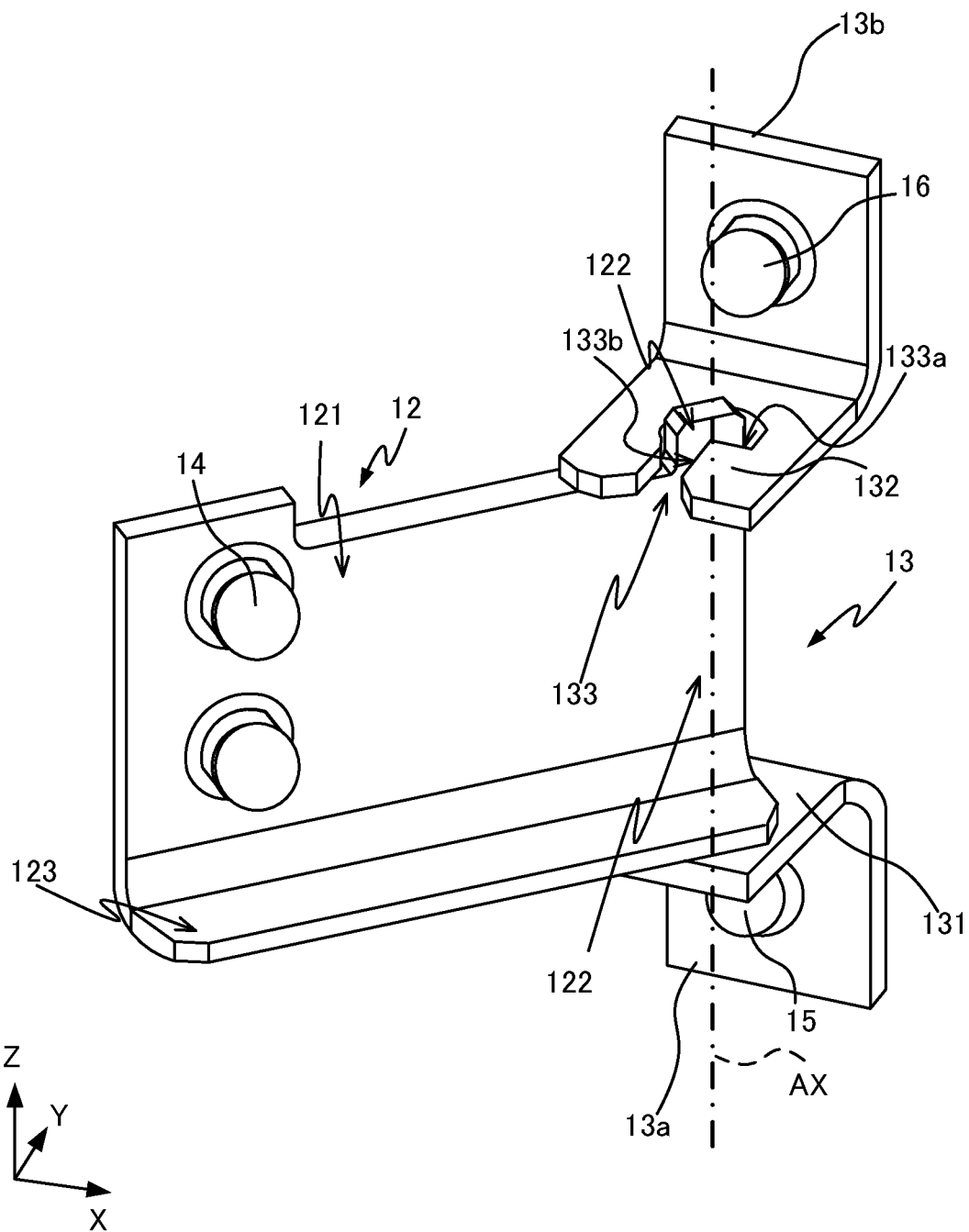
FIG. 4 is a perspective view illustrating the rotation of the first member according to Embodiment 1.
Figure 5:
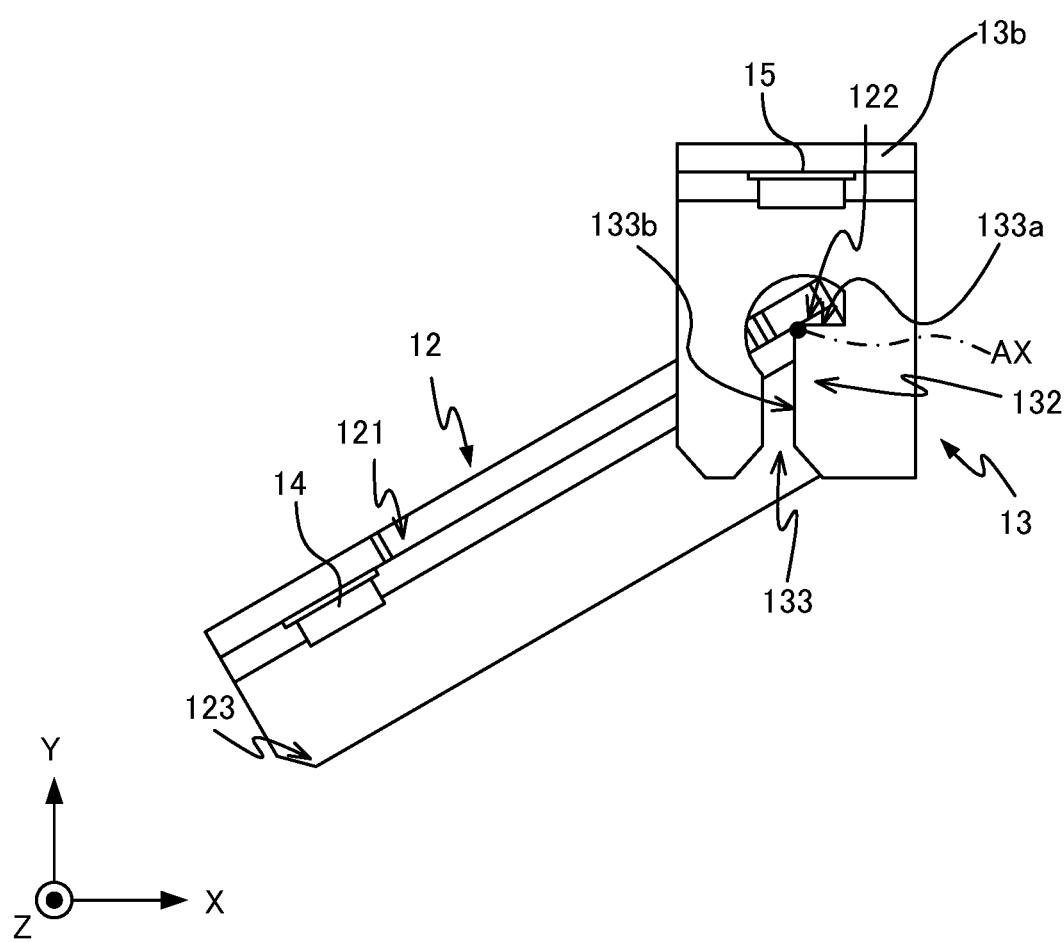
FIG. 5 is a top view illustrating the rotation of the first member according to Embodiment 1.

As the cover 11 is opened from the state illustrated in FIGS. 1, 2, and 3, the first member 12 rotates in the counterclockwise direction. FIGS. 4 and 5 illustrate an exemplary state when the cover 11 is half-opened. FIGS. 4 and 5 do not illustrate the housing 10 or the cover 11 in order to remain simple. During opening of the cover 11, the first member 12 rotates about the rotational axis AX in the counterclockwise direction while the protruding segment 122 is engaging with the notch 133. In detail, the first member 12 rotates about the rotational axis AX while remaining in contact with the portion between the first surface 133a and the second surface 133b.

Figure 6:
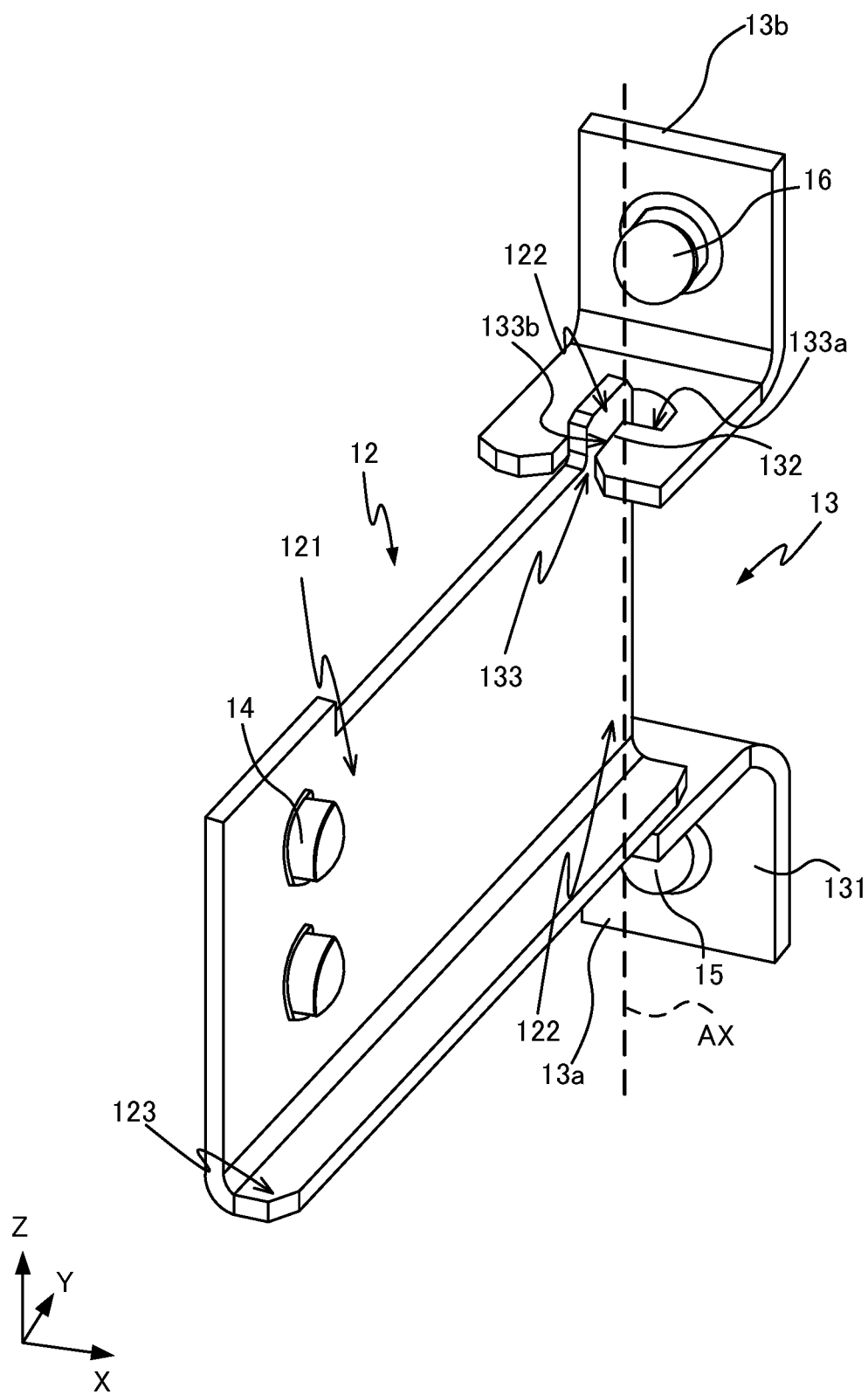
FIG. 6 is a perspective view illustrating the rotation of the first member according to Embodiment 1.
Figure 7:
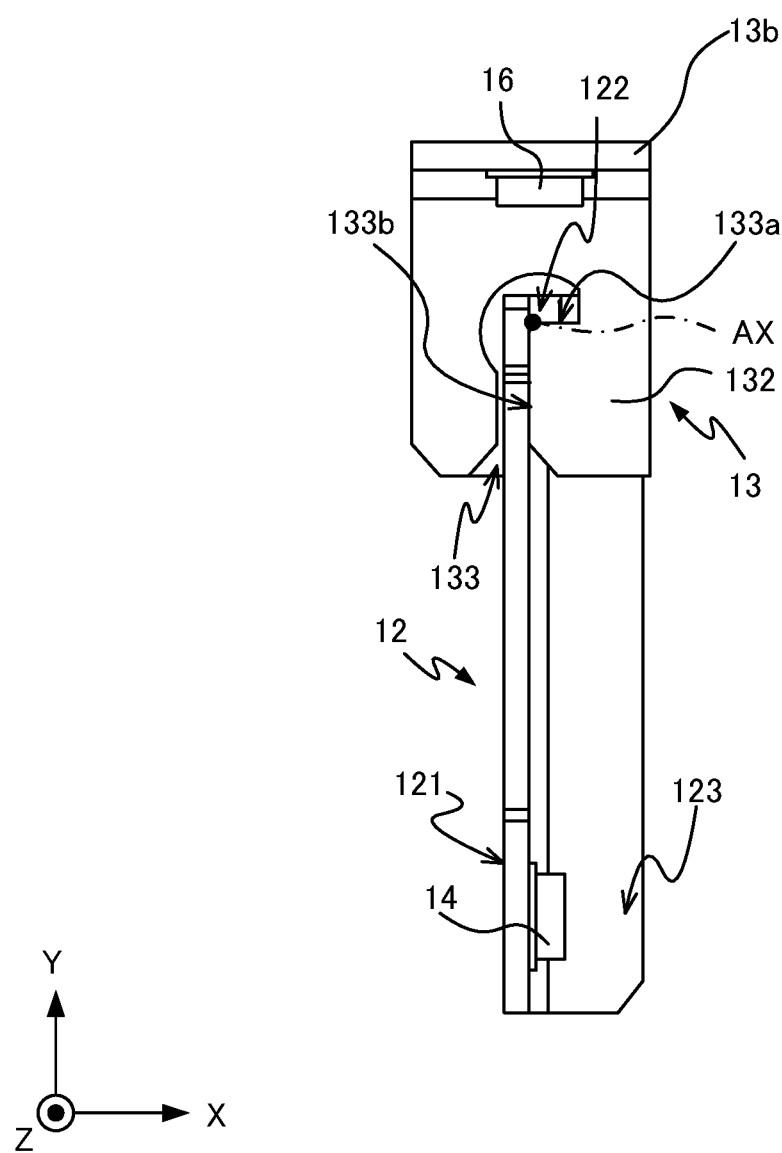
FIG. 7 is a top view illustrating the rotation of the first member according to Embodiment 1.

As the cover 11 is further opened from the state illustrated in FIGS. 4 and 5, the first member 12 rotates in the counterclockwise direction and shifts to the position illustrated in FIGS. 6 and 7. FIGS. 6 and 7 do not illustrate the housing 10 or the cover 11 in order to remain simple. The first member 12 in this state also rotates about the rotational axis AX in the counterclockwise direction while the protruding segment 122 is engaging with the notch 133, as described above. In the state illustrated in FIGS. 6 and 7, the first member 12 is in contact with the second surface 133b of the edge of the notch 133 extending in the Y-axis direction. This structure prevents the first member 12 from further rotating in the counterclockwise direction from the position illustrated in FIGS. 6 and 7. After the rotation of the first member 12 to the position at which the first member 12 is in contact with the second surface 133b, the first member 12 can be removed from the second member 13. The cover 11 can thus be detached from the housing 10.

As described above, the first member 12 can rotate about the rotational axis AX between the position illustrated in FIGS. 2 and 3 and the position illustrated in FIGS. 6 and 7. In detail, the rotation range of the first member 12 is limited to the range of 90° by the first surface 133a of the edge of the notch 133 extending in the X-axis direction and the second surface 133b of the edge of the notch 133 extending in the Y-axis direction. Accordingly, the cover 11 provided with the first members 12 can rotate about the rotational axis AX within the range of 90° to be opened and closed.

As described above, the in-vehicle device 1 according to Embodiment 1 can achieve opening and closing operations of the cover 11 by means of only the first members 12 and the second members 13. The first members 12 and the second members 13 do not require a rod-like shaft member as in the existing hinges and thus have simple structures. The first members 12 and the second members 13 can be fabricated by a deforming process alone, without a process, such as swaging or welding, necessary for preparation of the existing hinges. The first members 12 and the second members 13 can therefore be fabricated by a simple process.

Embodiment 2

Figure 8:
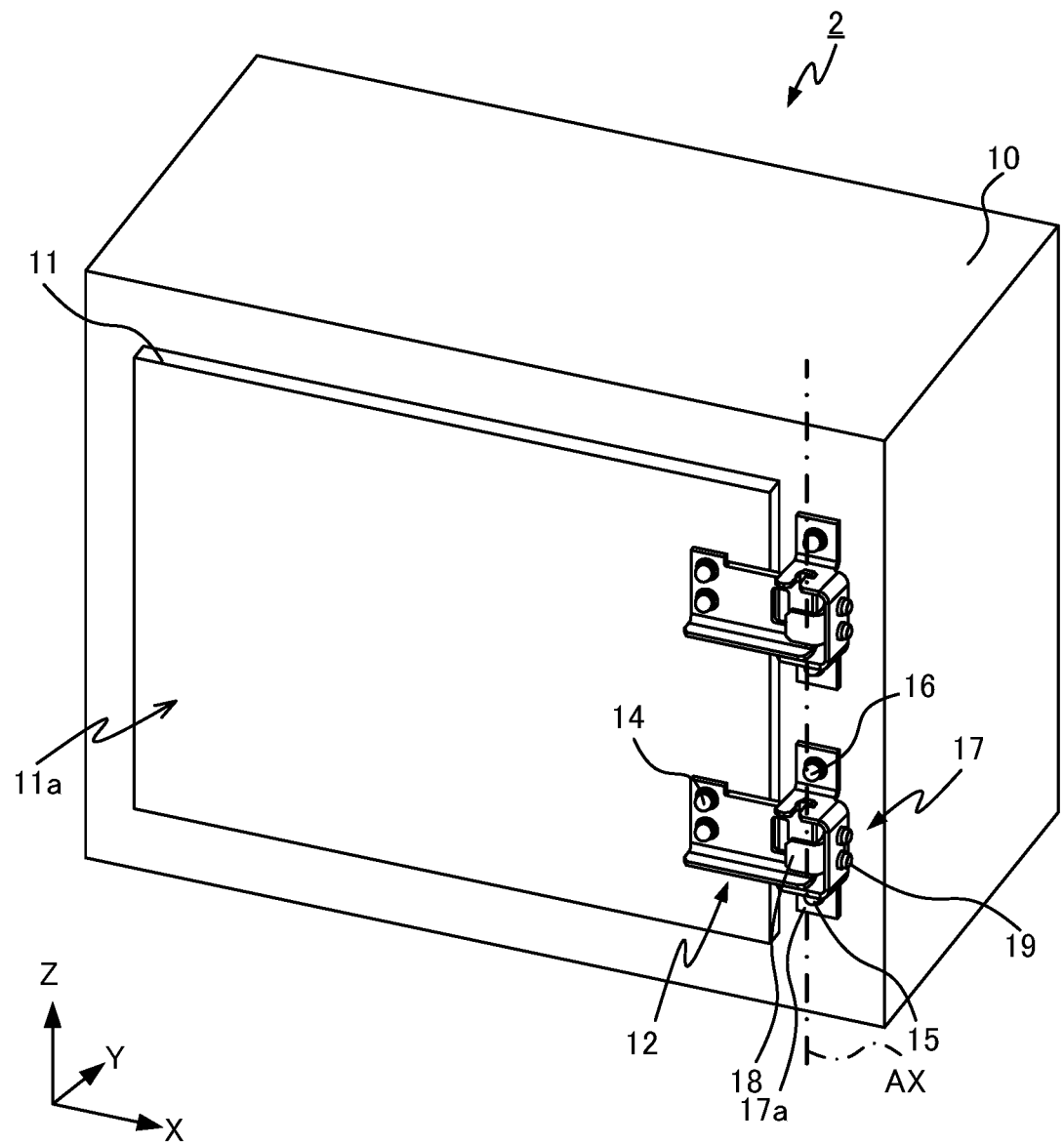
FIG. 8 is a perspective view of an in-vehicle device according to Embodiment 2 of the present disclosure.

The in-vehicle device 1 may further include a structure for preventing the cover 11 from being detached from the housing 10 while the cover 11 is open. As illustrated in FIG. 8, an in-vehicle device 2 according to Embodiment 2 further includes displacement limiters 18 to limit displacement of the first members 12 in a direction away from the housing 10 while the cover 11 is open. The in-vehicle device 2 also includes second members 17 to which the respective displacement limiters 18 are fixed.

Figure 9:
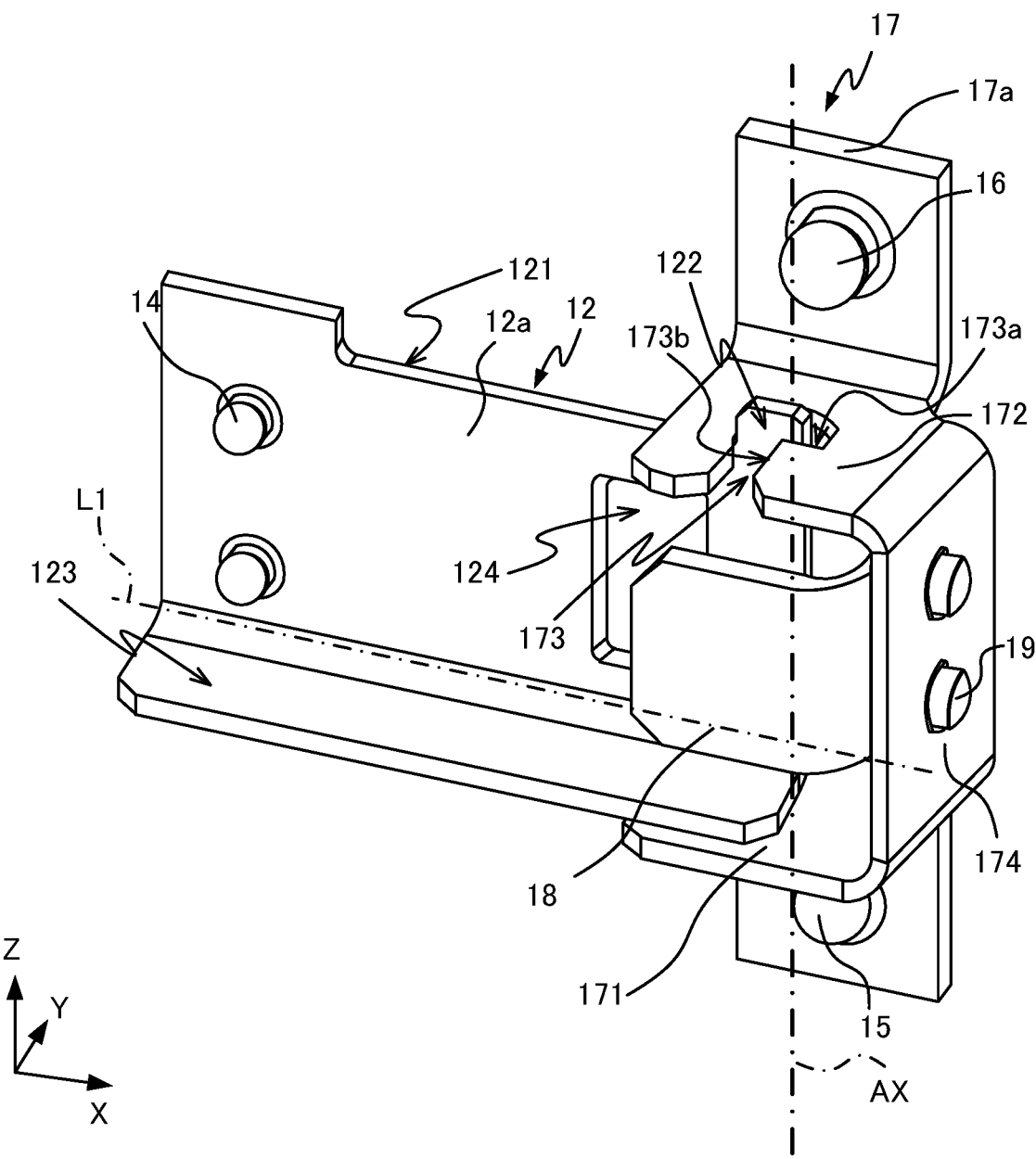
FIG. 9 is a perspective view of a first member and a second member according to Embodiment 2.

As illustrated in FIG. 9, which is an enlarged view of each combination of the first members 12, the second members 17, and the displacement limiters 18 in FIG. 8, the first member 12 in Embodiment 2 differs from the first member 12 in Embodiment 1 in that the first member 12 in Embodiment 2 has a hole 124 to receive the displacement limiter 18 inserted therein when the cover 11 is opened and to engage with the displacement limiter 18. The hole 124 is a through hole in Embodiment 2.

Figure 10:
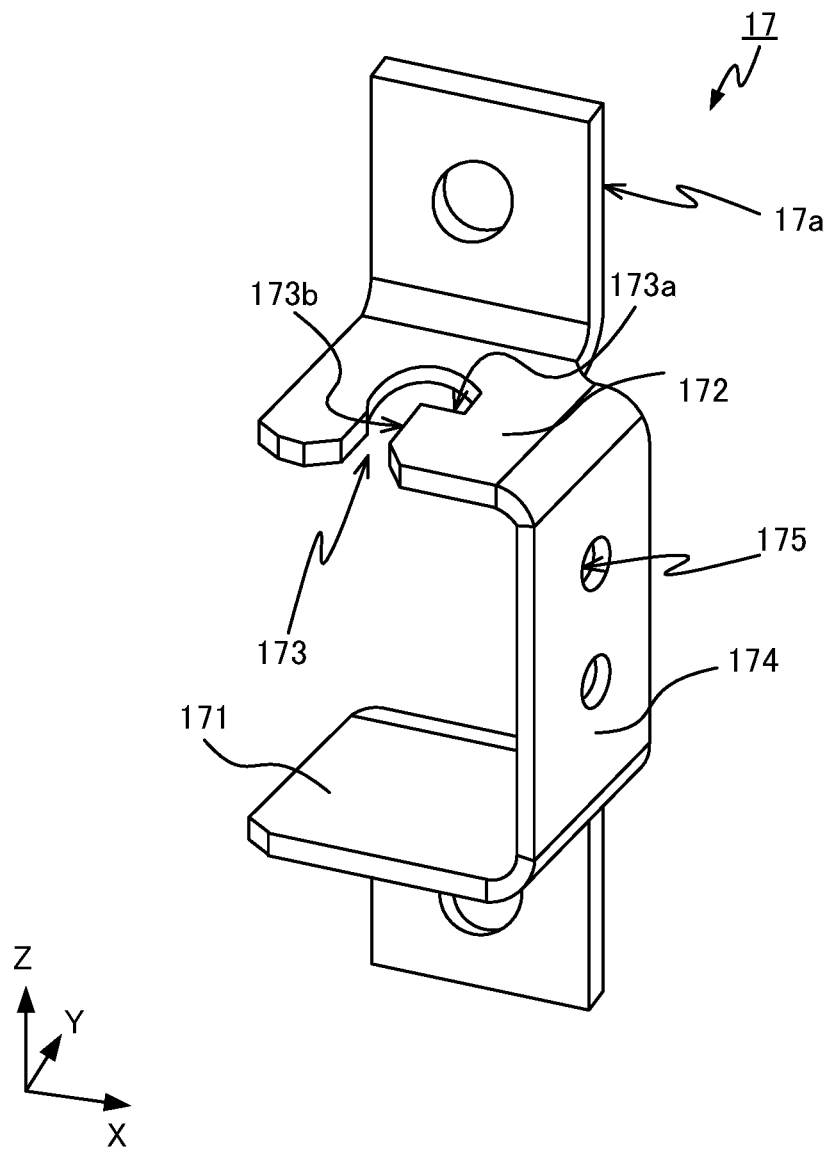
FIG. 10 is a perspective view of the second member according to Embodiment 2.

FIG. 10 illustrates only the second member 17 in order to clarify the structure of the second member 17. The second member 17 illustrated in FIGS. 9 and 10 includes a first-member supporting segment 171 to support the first member 12, and a rotation-range limiting segment 172 having a shape for limiting the rotation range of the first member 12. The rotation-range limiting segment 172 has a notch 173, as in Embodiment 1. The second member 17 also includes a joint segment 174 that connects the first-member supporting segment 171 to the rotation-range limiting segment 172 and is provided with the displacement limiter 18.

The first-member supporting segment 171 abuts on the lower surface in the vertical direction of the extending segment 123 of the first member 12 and thereby supports the first member 12.

The rotation-range limiting segment 172 has the notch 173 to engage with the protruding segment 122. The notch 173 has the shape identical to that of the notch 133 in Embodiment 1. The rotation-range limiting segment 172 limits the rotation range of the first member 12 to the range between the position at which the first member 12 is in contact with a first surface 173a of the edge of the notch 173 and the position at which the first member 12 is in contact with a second surface 173b of the edge of the notch 173. The first surface 173a intersects with the second surface 173b. The first surface 173a is orthogonal to the second surface 173b in Embodiment 2. In detail, the first surface 173a extends in the X-axis direction, and the second surface 173b extends in the Y-axis direction. The rotation range of the first member 12 is therefore limited to the range of 90° between the position at which the main surface of the first member 12 is parallel to the X axis and the position at which the main surface of the first member 12 is parallel to the Y axis. The edge of the notch 173 partially has an arc shape in the XY plane so as not to inhibit the rotation of the first member 12.

The joint segment 174 has through holes 175 to receive fasteners 19 inserted therein. The fasteners 19 inserted in the through holes 175 fasten the displacement limiter 18 to the second member 17.

Each of the second members 17 is preferably fabricated by bending a single plate member. For example, the second member 17 is made of a metal plate 17a in Embodiment 2. In detail, the metal plate 17a is made of stainless-steel or iron, for example, and is bent. In the bent metal plate 17a, one of the portions opposed in the Z-axis direction serves as the first-member supporting segment 171, while the other of the portions serves as the rotation-range limiting segment 172.

The displacement limiter 18 is fixed to the joint segment 174 of the second member 17 and extends in a direction away from the joint segment 174. In detail, the displacement limiter 18 is fixed to the joint segment 174 and extends toward the negative side in the X-axis direction. The displacement limiter 18 is preferably made of a bent metal plate.

The following description is directed to opening and closing operations of the cover 11 of the in-vehicle device 2 having the above-described structure.

Figure 11:
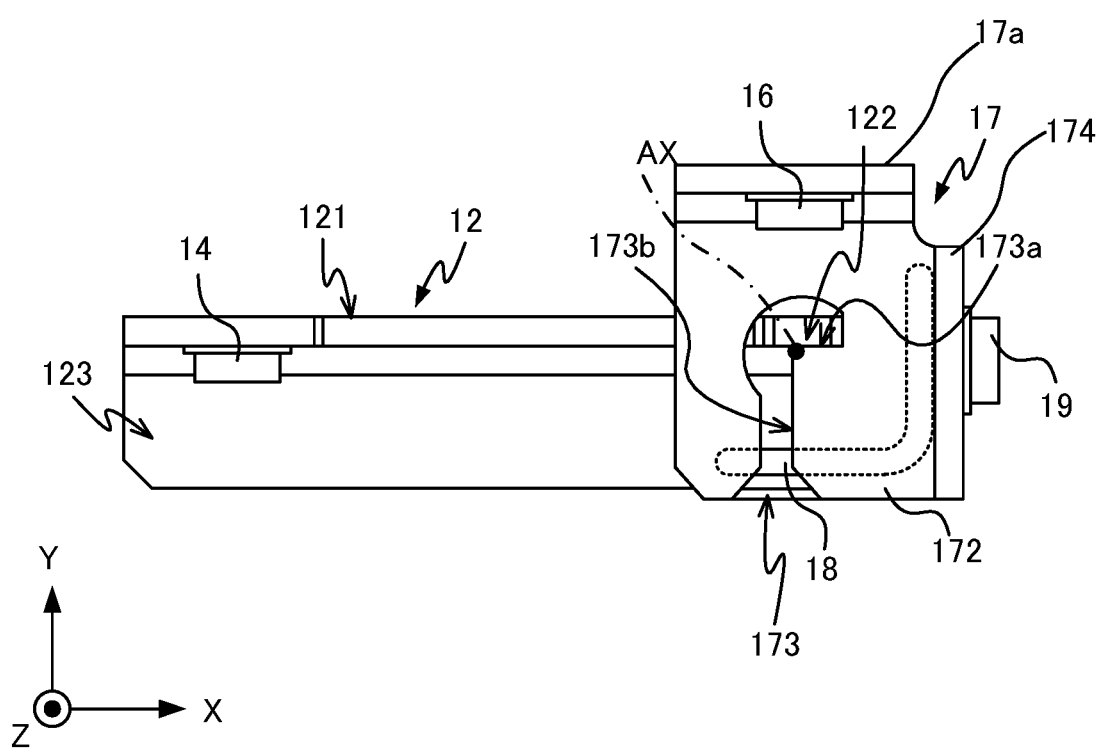
FIG. 11 is a top view illustrating a rotation of the first member according to Embodiment 2.

FIGS. 8 and 9 illustrate a state when the cover 11 is closed. FIG. 11 illustrates the first member 12 and the second member 17 in this state as viewed toward the negative side in the Z-axis direction. FIG. 11 does not illustrate the housing 10 or the cover 11 in order to remain simple. While the cover 11 is closed, the first member 12 is in contact with the first surface 173a of the edge of the notch 173.

Figure 12:
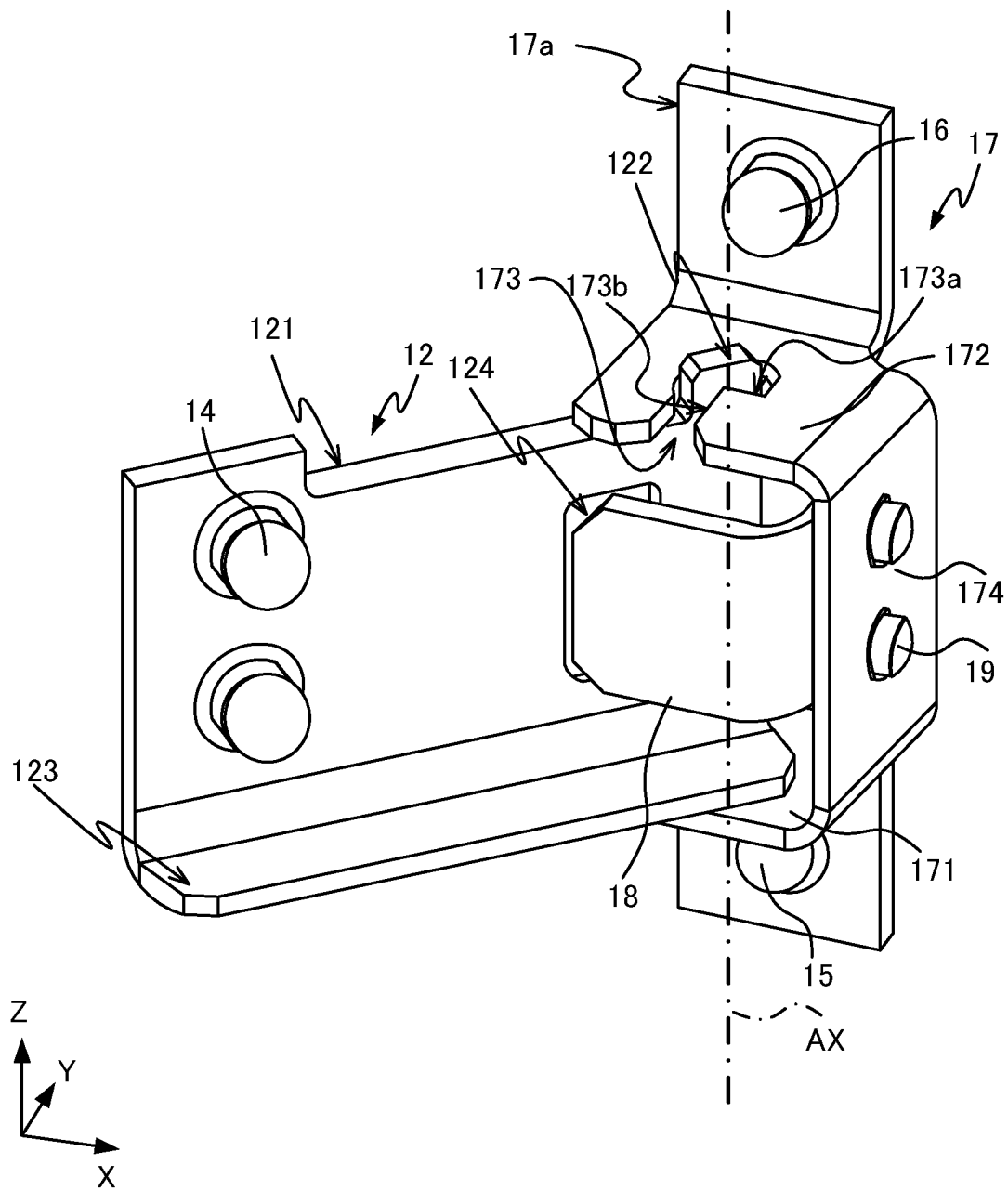
FIG. 12 is a perspective view illustrating the rotation of the first member according to Embodiment 2.
Figure 13:
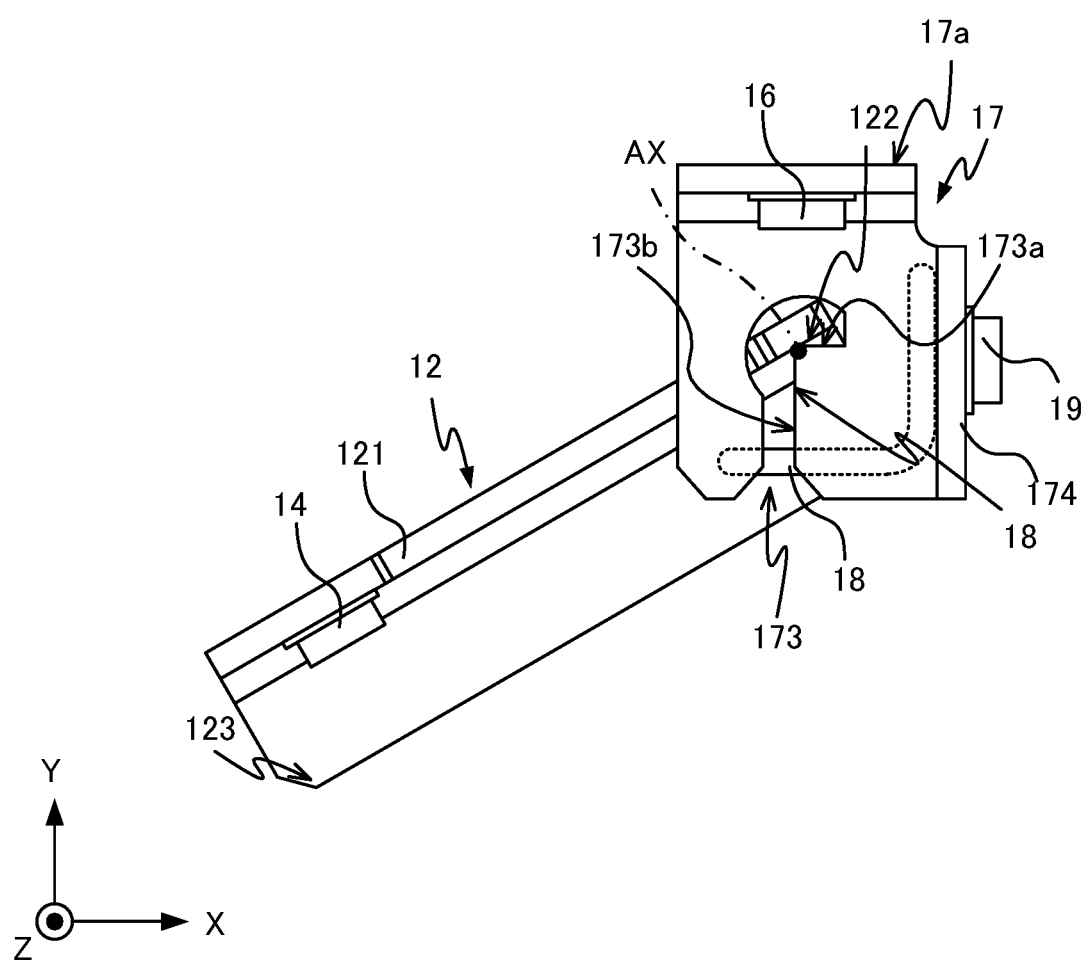
FIG. 13 is a top view illustrating the rotation of the first member according to Embodiment 2.

As the cover 11 is opened from the state illustrated in FIGS. 8, 9, and 11, the first member 12 rotates in the counterclockwise direction. FIGS. 12 and 13 illustrate an exemplary state when the cover 11 is half-opened. FIGS. 12 and 13 do not illustrate the housing 10 or the cover 11 in order to remain simple. During opening of the cover 11, the first member 12 rotates about the rotational axis AX in the counterclockwise direction while the protruding segment 122 is engaging with the notch 173.

Figure 14:
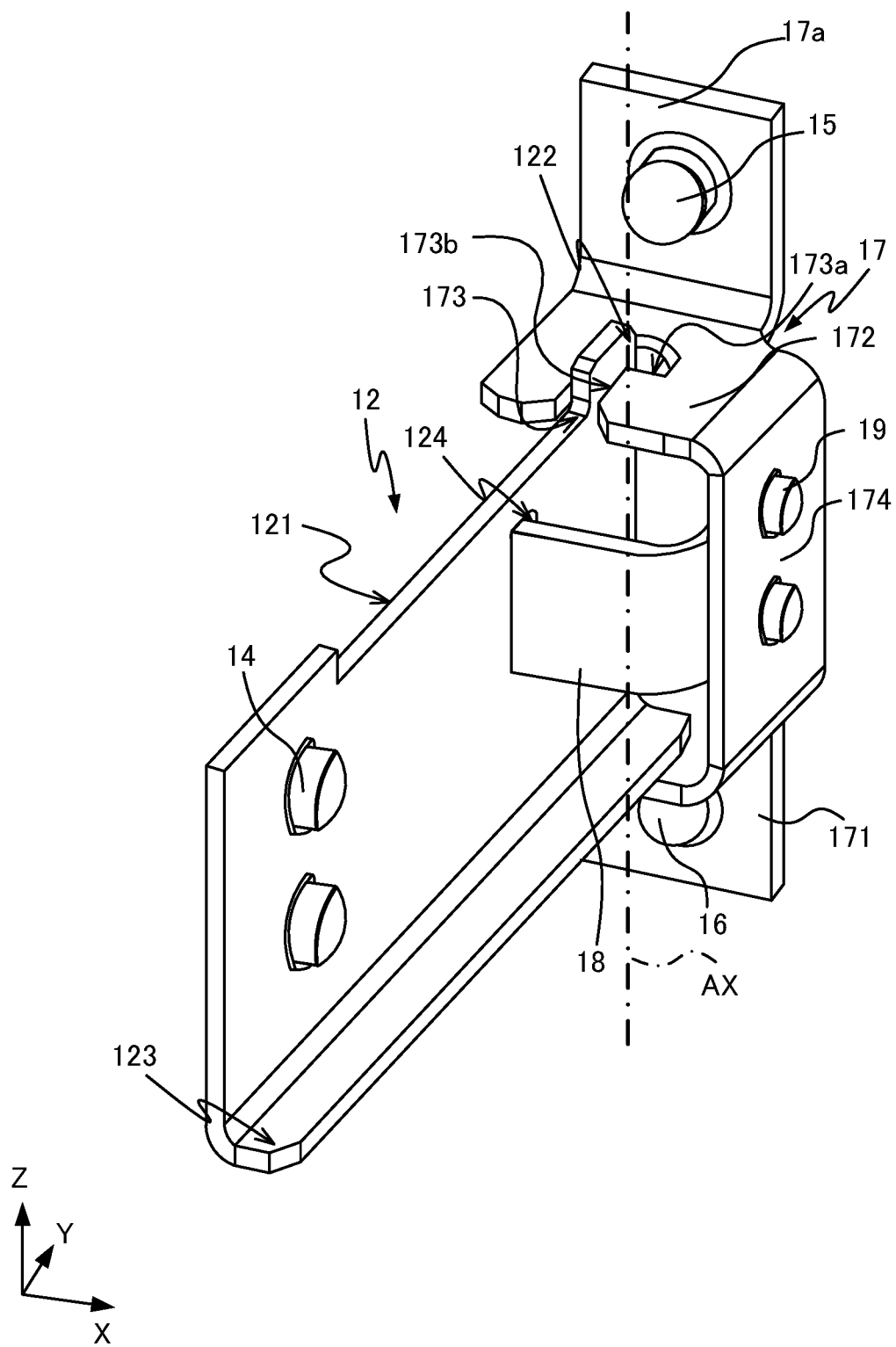
FIG. 14 is a perspective view illustrating the rotation of the first member according to Embodiment 2.
Figure 15:
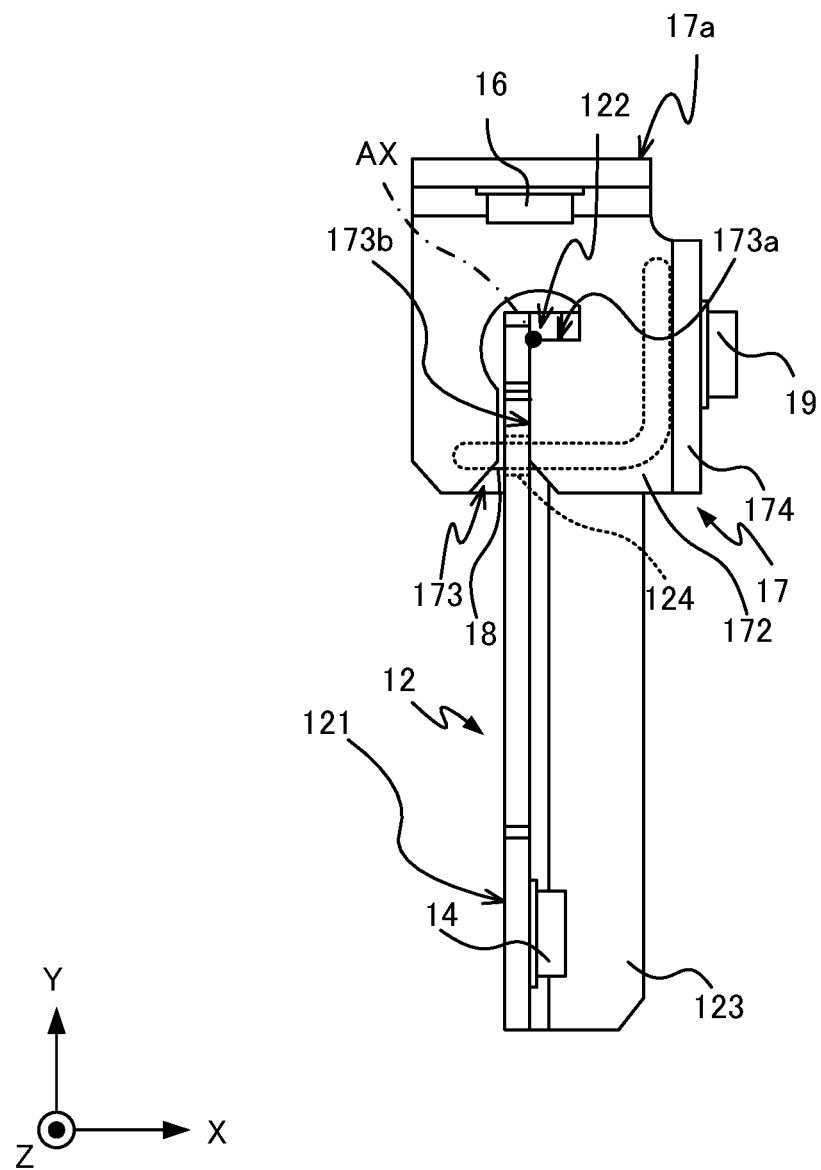
FIG. 15 is a top view illustrating the rotation of the first member according to Embodiment 2.

As the cover 11 is further opened from the state illustrated in FIGS. 12 and 13, the first member 12 rotates in the counterclockwise direction and shifts to the position illustrated in FIGS. 14 and 15. FIGS. 14 and 15 do not illustrate the housing 10 or the cover 11 in order to remain simple. The first member 12 in this state also rotates about the rotational axis AX in the counterclockwise direction while the protruding segment 122 is engaging with the notch 173, as described above. In the state illustrated in FIGS. 14 and 15, the first member 12 is in contact with the second surface 173b of the edge of the notch 173 extending in the Y-axis direction. This structure prevents the first member 12 from further rotating in the counterclockwise direction from the position illustrated in FIGS. 14 and 15.

In the state illustrated in FIGS. 14 and 15, the displacement limiter 18 is inserted in the hole 124 of the first member 12 and engages with the first member 12. That is, when the first member 12 shifts in a direction away from the housing 10, that is, in the Y-axis direction, the first member 12 comes into contact with the displacement limiter 18 and is therefore prevented from being displaced in the Y-axis direction. This structure can avoid detachment of the cover 11 from the housing 10.

As described above, the first member 12 can rotate about the rotational axis AX between the position illustrated in FIGS. 8, 9, and 11 and the position illustrated in FIGS. 14 and 15. In detail, the rotation range of the first member 12 is limited to the range of 90° by the first surface 173a of the edge of the notch 173 extending in the X-axis direction and the second surface 173b of the edge of the notch 173 extending in the Y-axis direction. Accordingly, the cover 11 provided with the first members 12 can rotate about the rotational axis AX within the range of 90° to be opened and closed.

As described above, the in-vehicle device 2 according to Embodiment 2 can achieve opening and closing operations of the cover 11 by means of only the first members 12 and the second members 17. The first members 12 and the second members 17 do not require a rod-like shaft member as in the existing hinges and thus have simple structures. The first members 12 and the second members 17 can be fabricated by a deforming process alone, without a process, such as swaging or welding, necessary for preparation of the existing hinges. The first members 12 and the second members 13 can therefore be fabricated by a simple process.

In addition, the displacement limiters 18 included in the in-vehicle device 2 can avoid detachment of the cover 11 from the housing 10 while the cover 11 is open.

Embodiment 3

In the case where the housing 10 has a larger opening in accordance with the increased size of the in-vehicle device 1 or 2, the housing 10 requires a larger cover 11. The larger cover 11 having a higher weight may be displaced downward due to its own weight. The cover 11 disposed downward due to its own weight cannot cover the entire opening of the housing 10, thereby impairing the air tightness of the in-vehicle device 1 or 2. In order to solve this problem, an in-vehicle device 3 according to Embodiment 3 includes a cover retainer 20 to retain the cover 11 while the cover 11 is closed.

Figure 16:
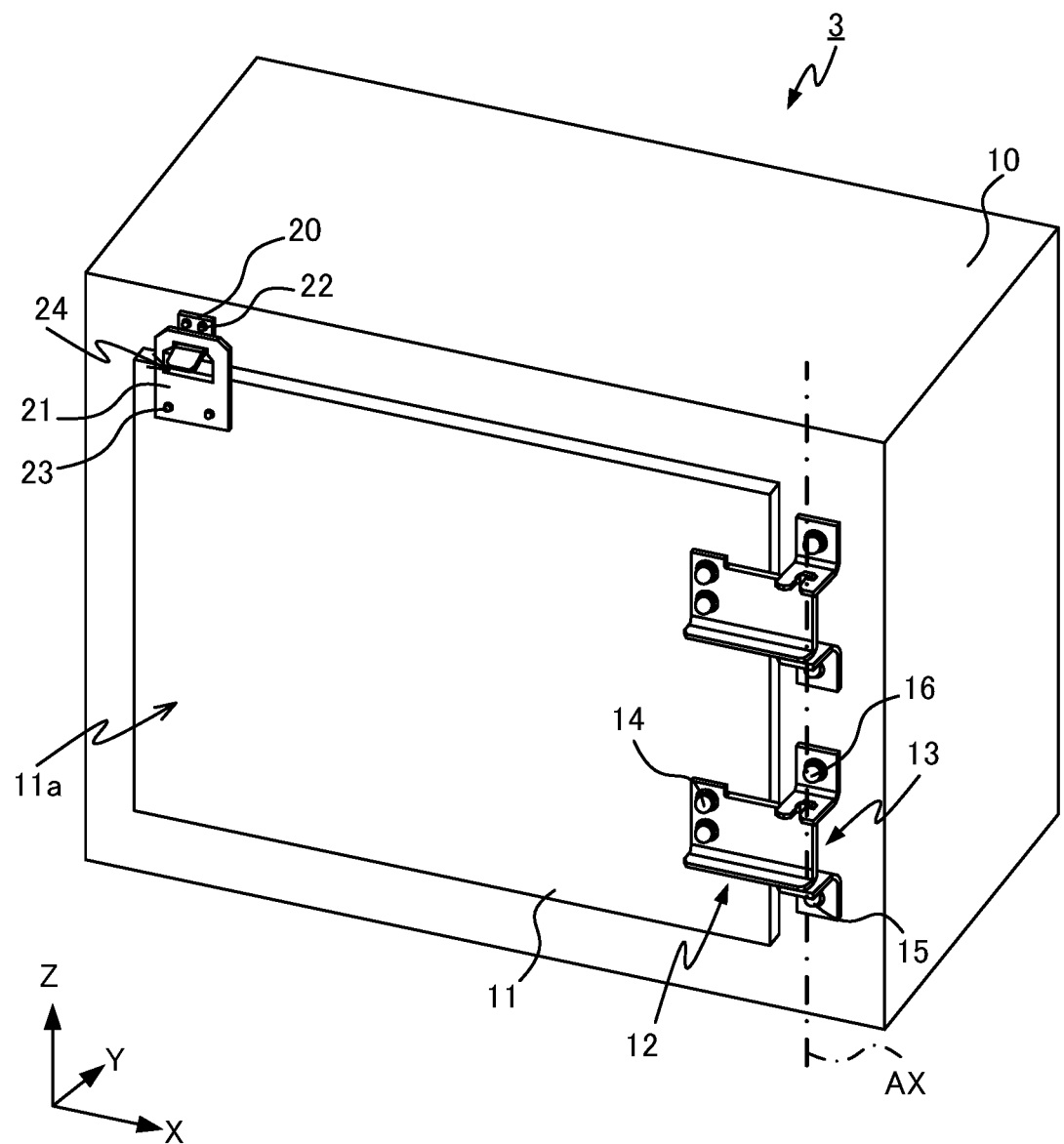
FIG. 16 is a perspective view of an in-vehicle device according to Embodiment 3 of the present disclosure.

The in-vehicle device 3 illustrated in FIG. 16 further includes the cover retainer 20 fixed to the housing 10, and an engaging member 21 fixed to the cover 11 to engage with the cover retainer 20 while the cover 11 is closed, in addition to the components of the in-vehicle device 1.

Figure 17:
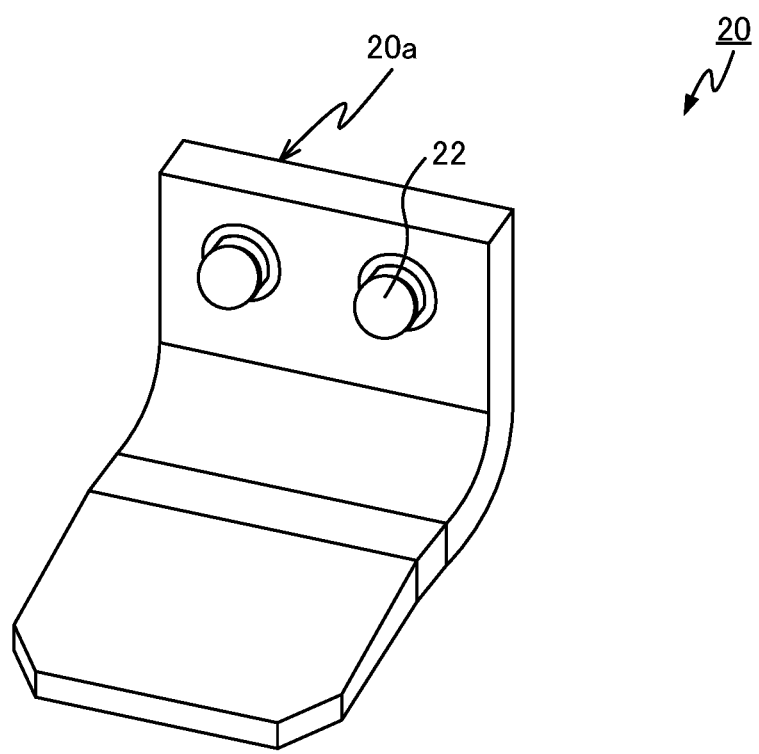
FIG. 17 is a perspective view of a cover retainer according to Embodiment 3.

The cover retainer 20 illustrated in FIG. 17 is fastened on the housing 10 with fasteners 22. The cover retainer 20 has a plate shape extending in a direction away from the housing 10. In detail, the cover retainer 20 extends in a direction away from the housing 10 while approaching the negative side in the Z-axis direction. The cover retainer 20 is preferably made of a bent metal plate 20a.

Figure 18:
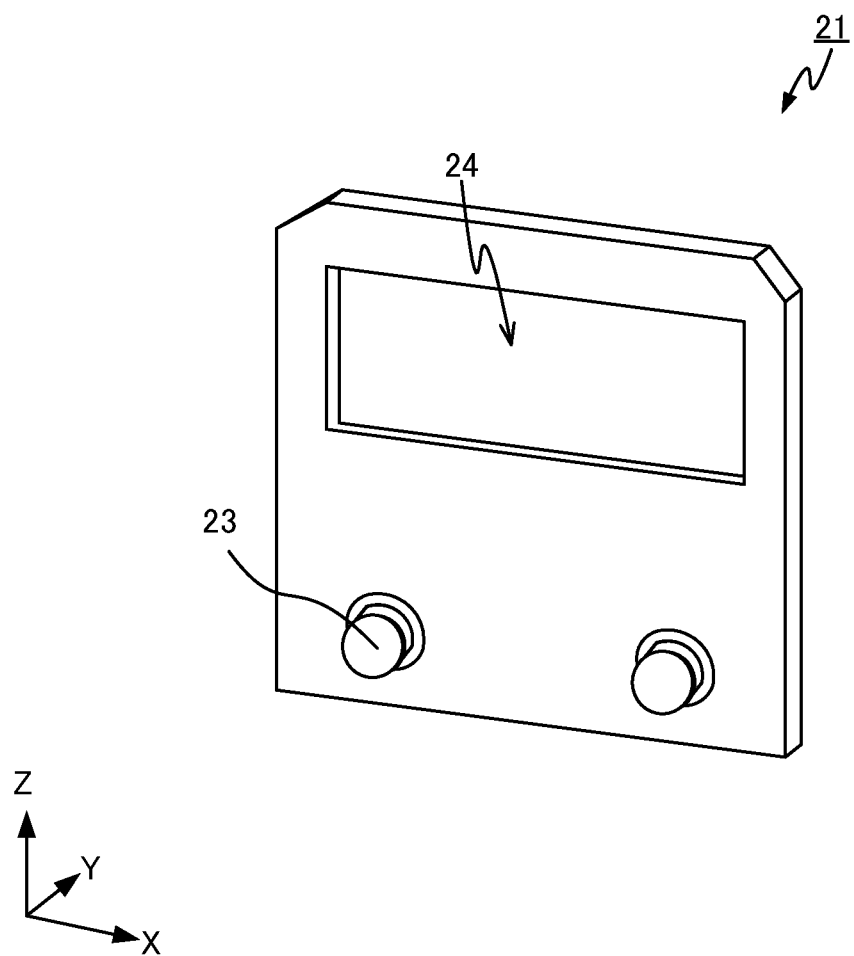
FIG. 18 is a perspective view of an engaging member according to Embodiment 3.

The engaging member 21 illustrated in FIG. 18 is fastened on the cover 11 with fasteners 23. The engaging member 21 is preferably fixed at a position sufficiently distant from the positions of the first members 12 in the cover 11. In Embodiment 3, the first members 12 are fixed adjacent to one end of the cover 11 in the longitudinal direction, that is, the X-axis direction, while the engaging member 21 is fixed adjacent to the other end of the cover 11 in the X-axis direction.

The engaging member 21 has a through hole 24 to receive the cover retainer 20 inserted therein when the cover 11 is closed. When the cover 11 is closed, the cover retainer 20 is inserted in the through hole 24, so that the engaging member 21 engages with the cover retainer 20. This structure can prevent the cover 11 from being displaced downward due to its own weight.

As described above, the in-vehicle device 3 according to Embodiment 3 includes the cover retainer 20 and the engaging member 21, which can prevent the cover 11 from being displaced downward due to its own weight while the cover 11 is closed.

The above-described embodiments are not intended to limit the scope of the present disclosure. Some features of the embodiments may be combined with each other. For example, the in-vehicle device 2 may include the cover retainer 20 and the engaging member 21.

The number and positions of the first members 12 and the second members 13 or 17 included in any of the in-vehicle devices 1 to 3 may be arbitrarily determined depending on the properties, such as material and weight, of the cover 11.

Each of the first members 12 may have any shape other than that of the above-described examples, provided that the first member 12 is fixed to the cover 11 and can rotate while the protruding segment 122 is engaging with the second member 13. For example, the first member 12 may be a metal plate having a thickness of 10 millimeters. In this case, the first-member supporting segment 131 or 171 abuts on the lower end surface in the vertical direction of the first member 12 and thereby supports the first member 12.

Each of the first members 12 may include a protruding segment 122 protruding toward the positive side in the Z-axis direction and another protruding segment 122 protruding toward the negative side in the Z-axis direction. In this case, the first-member supporting segment 131 or 171 has a notch 133 or 173, like the rotation-range limiting segment 132 or 172.

The first members 12 may be fixed to the cover 11 by any procedure other than the procedure using the fasteners 14. For example, the first members 12 may be fixed to the cover 11 by welding. The first members 12 may be fixed to the cover 11 while being in direct contact with the main surface 11a of the cover 11, or while holding other members between the first members 12 and the main surface 11a.

The holes 124 of the first members 12 included in the in-vehicle device 2 may also be openings facing downward in the Z-axis direction.

Figure 19:
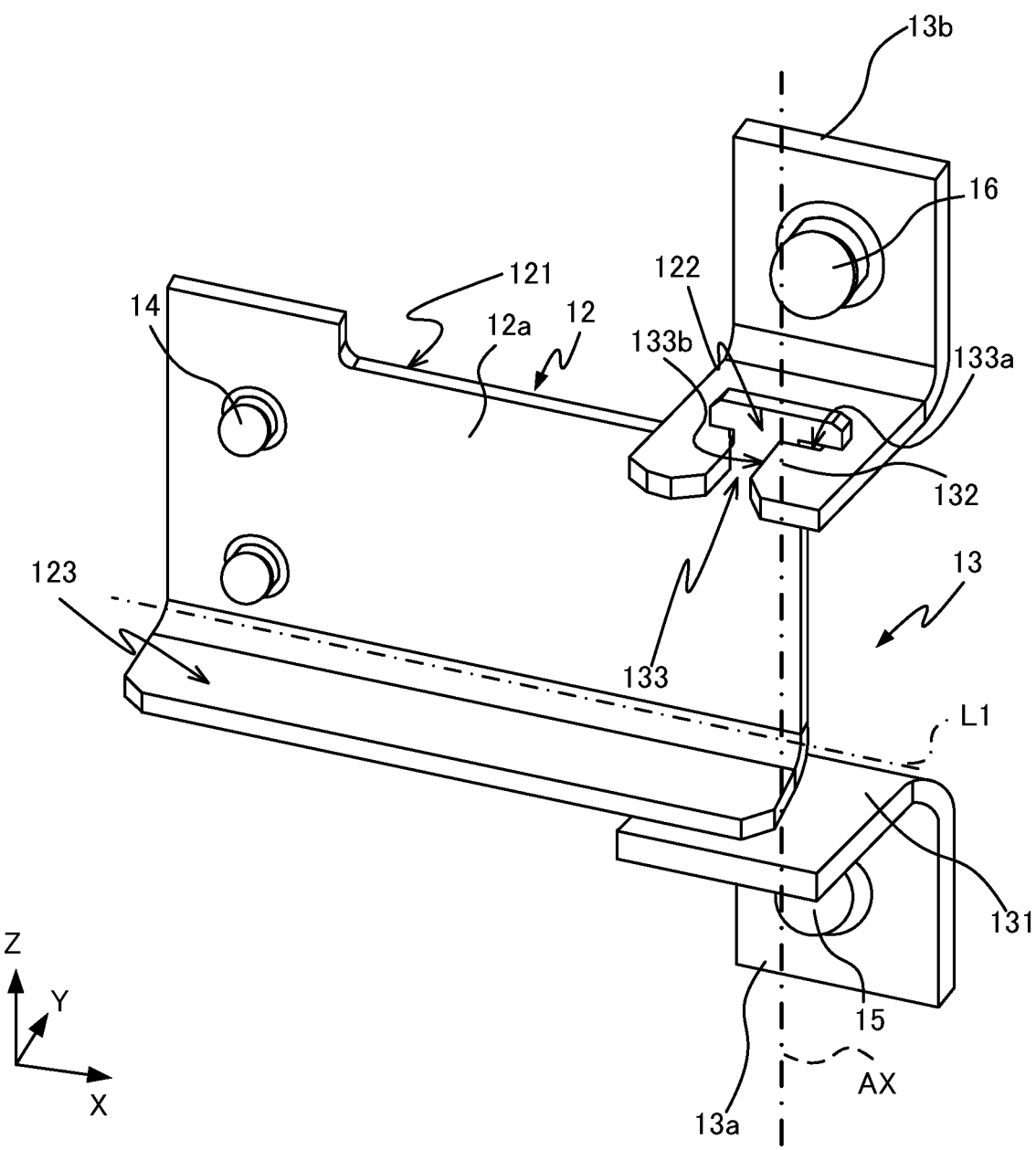
FIG. 19 is a perspective view of a first modification of the first member and the second member according to the embodiments.

Each of the second members 13 may have any shape other than that of the above-described examples. The metal plate 13b located at the upper position in the Z-axis direction may serve as both of the rotation-range limiting segment 132 and the first-member supporting segment 131. FIG. 19 illustrates the second member 13 made of the metal plate 13b and including the rotation-range limiting segment 132. This rotation-range limiting segment 132 has the notch 133 and supports the first member 12. In this case, the portion of the protruding segment 122 of the first member 12 located above the metal plate 13b in the vertical direction has a shape extending in the horizontal direction. The upper surface in the vertical direction of the rotation-range limiting segment 132 of the second member 13 abuts on the lower surface in the vertical direction of the portion of the protruding segment 122 extending in the horizontal direction, and thereby supports the first member 12.

The second members 13 or 17 may be fixed to the housing 10 by any procedure other than the procedure using the fasteners 15 and 16. For example, the second members 13 or 17 may be fixed to the housing 10 by welding. The second members 13 or 17 may be fixed to the housing 10 while being in direct contact with the housing 10, or while holding other members between the second members 13 or 17 and the housing 10.

Figure 20:
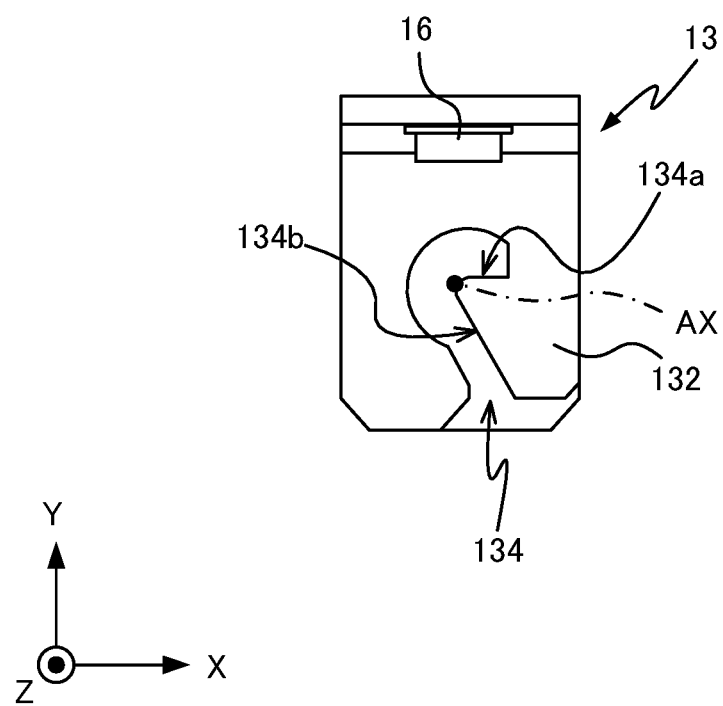
FIG. 20 is a top view of a second modification of the second member according to the embodiments.

The rotation-range limiting segment 132 may have any shape provided that the rotation-range limiting segment 132 can limit the rotation range of the first member 12 to a rotation range necessary for the cover 11. For example, FIG. 20 illustrates the second member 13 including the rotation-range limiting segment 132. This rotation-range limiting segment 132 has a notch 134. The edge of the notch 134 has a first surface 134a extending in the X-axis direction and a second surface 134b defining an acute angle from the first surface 134a. For example, the acute angle between the first surface 134a and the second surface 134b is 60°. This structure limits the rotation range of the first member 12 to the range of 120° between the position at which the first member 12 is in contact with the first surface 134a and the position at which the first member 12 is in contact with the second surface 134b.

Figure 21:
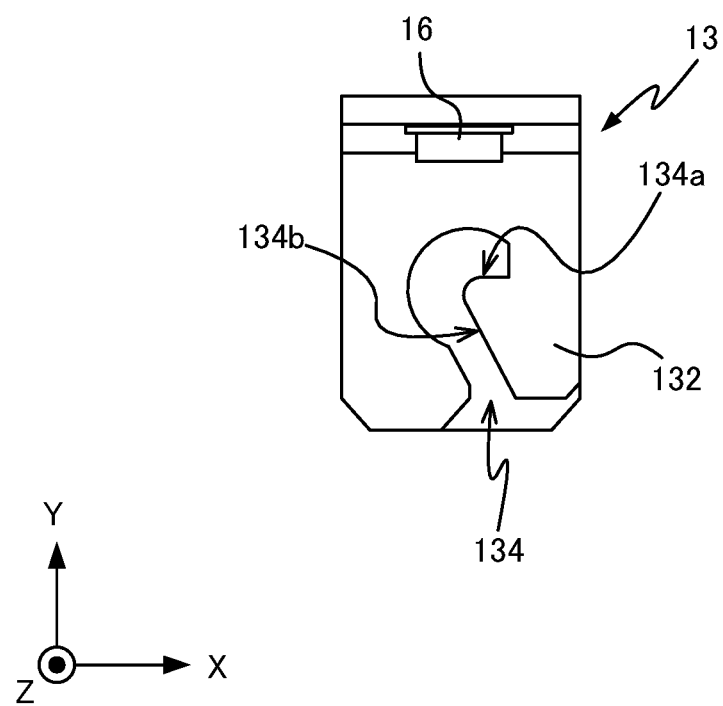
FIG. 21 is a top view of a third modification of the second member according to the embodiments.

The first surface 133a and the second surface 133b may adjoin each other as in the above-described embodiments or may be adjacent to each other via another member. The same holds true for the first surface 134a and the second surface 134b, and for the first surface 173a and the second surface 173b. FIG. 21 illustrates an example in which the first surface 134a is continuous with the second surface 134b via another member. As illustrated in FIG. 21, the first surface 134a may be smoothly connected to the second surface 134b via a curved surface. Although FIG. 21 does not illustrate the rotational axis AX so as to clarify the shape of the rotation-range limiting segment 132, the rotational axis AX intersects the curved line that connects the straight line corresponding to the first surface 134a to the straight line corresponding to the second surface 134b in the XY plane.

The first surface 133a, 134a, or 173a and the second surface 133b, 134b, or 173b are not necessarily flat surfaces and may be curved surfaces.

The first members 12 do not have to be in contact with the entire first surface 133a, 134a, or 173a or the entire second surface 133b, 134b, or 173b. The rotation range of the first member 12 may also be limited due to the first members 12 coming into contact with a part of the first surface 133a, 134a, or 173a and a part of the second surface 133b, 134b, or 173b.

The displacement limiters 18 may also be fixed to the housing 10. Each of the displacement limiters 18 may have any shape provided that the displacement limiter 18 limits displacement of the first member 12 in a direction away from the housing 10 while the cover 11 is open. For example, the displacement limiter 18 may be a protrusion that comes into contact with a part of the first member 12 and thereby limits displacement of the first member 12 in a direction away from the housing 10.

The displacement limiters 18 may be fixed to the second members 17 by any procedure other than the procedure using the fasteners 19. For example, the displacement limiters 18 may be fixed to the second members 17 by welding. The displacement limiters 18 may be fixed to the second members 17 while being in direct contact with the second members 17, or while holding other members between the displacement limiters 18 and the second members 17. The same holds true for the displacement limiters 18 fixed to the housing 10.

The cover retainer 20 may have any shape provided that the cover retainer 20 can prevent the cover 11 from being displaced downward due to its own weight. For example, the cover retainer 20 may be a protrusion fixed to the housing 10 to come into contact with the lower edge in the vertical direction of the cover 11 and thereby retain the cover 11.

The rotational axis AX may also extend in a direction intersecting the Z axis other than the Z-axis direction.

The in-vehicle devices 1 to 3 may also be installed in other vehicles, such as automobiles, marine vessels, and aircrafts, as well as railway vehicles. The in-vehicle devices 1 to 3 may also be provided at any site, such as on the floor or on the roof, as well as under the floor.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 In-vehicle device
10 Housing
11 Cover
11a Main surface
12 First member
12a, 13a, 13b, 17a, 20a Metal plate
13, 17 Second member
14, 15, 16, 19, 22, 23 Fastener
18 Displacement limiter
20 Cover retainer
21 Engaging member
24, 175 Through hole
121 Fitting segment
122 Protruding segment
123 Extending segment
124 Hole
131, 171 First-member supporting segment
132, 172 Rotation-range limiting segment
133, 134, 173 Notch
133a, 134a, 173a First surface
133b, 134b, 173b Second surface
174 Joint segment
AX Rotational axis
L1 Bending line

The invention claimed is:

1. An in-vehicle device, comprising:
a housing having an opening;
an openable and closable cover disposed over the opening;
a first member fixed to the cover to rotate about a rotational axis, the first member comprising (i) a plate-like protruding segment protruding in a direction of the rotational axis and (ii) a plate-like fitting segment fixed to a main surface of the cover, the plate-like protruding segment having a surface that is coplanar with a surface of the plate-like fitting segment; and
a second member fixed to the housing to support the first member such that the first member is rotatable about the rotational axis, the second member comprising a notch around a point of intersection with the rotational axis, the notch being configured to engage with the protruding segment, wherein
an edge of the notch has a first surface and a second surface intersecting with each other, and
the second member limits a rotation range of the first member about the rotational axis to a range between a position at which the first member is in contact with the first surface and a position at which the first member is in contact with the second surface.

2. The in-vehicle device according to claim 1, wherein the second member limits displacement of the first member in the direction of the rotational axis.

3. The in-vehicle device according to claim 2, wherein the first member rotates about the rotational axis while remaining in contact with the second member.

4. The in-vehicle device according to claim 3, wherein
the first member further comprises a plate-like extending segment adjoining the fitting segment and extending in a direction away from the main surface of the cover, and
the second member abuts on a lower surface in a vertical direction of the extending segment of the first member, thereby supporting the first member.

5. The in-vehicle device according to claim 4, wherein
the first member comprises a metal plate bent along a bending line, and
a portion of the metal plate facing the cover serves as the fitting segment, a portion of the metal plate extending from the fitting segment in the direction of the rotational axis serves as the protruding segment, and a portion of the metal plate protruding from the fitting segment in a direction intersecting the bending line serves as the extending segment.

6. The in-vehicle device according to claim 2, wherein
the first member further comprises a plate-like extending segment adjoining the fitting segment and extending in a direction away from the main surface of the cover, and
the second member abuts on a lower surface in a vertical direction of the extending segment of the first member, thereby supporting the first member.

7. The in-vehicle device according to claim 6, wherein
the first member comprises a metal plate bent along a bending line, and
a portion of the metal plate facing the cover serves as the fitting segment, a portion of the metal plate extending from the fitting segment in the direction of the rotational axis serves as the protruding segment, and a portion of the metal plate protruding from the fitting segment in a direction intersecting the bending line serves as the extending segment.

8. The in-vehicle device according to claim 1, wherein the first member rotates about the rotational axis while remaining in contact with the second member.

9. The in-vehicle device according to claim 8, wherein
the first member further comprises a plate-like extending segment adjoining the fitting segment and extending in a direction away from the main surface of the cover, and
the second member abuts on a lower surface in a vertical direction of the extending segment of the first member, thereby supporting the first member.

10. The in-vehicle device according to claim 9, wherein
the first member comprises a metal plate bent along a bending line, and
a portion of the metal plate facing the cover serves as the fitting segment, a portion of the metal plate extending from the fitting segment in the direction of the rotational axis serves as the protruding segment, and a portion of the metal plate protruding from the fitting segment in a direction intersecting the bending line serves as the extending segment.

11. The in-vehicle device according to claim 1, wherein the second member comprises:
a first-member supporting segment to support the first member; and
a rotation-range limiting segment having a shape for limiting the rotation range of the first member by coming into contact with the first member.

12. The in-vehicle device according to claim 11, wherein
the second member comprises a pair of plate members at least partially opposed to each other in the direction of the rotational axis,
one of the pair of plate members serves as the first-member supporting segment to support the first member such that the first member is rotatable, and
the other of the pair of plate members serves as the rotation-range limiting segment comprising the notch.

13. The in-vehicle device according to claim 1, further comprising:
a cover retainer fixed to the housing to retain the cover while the cover is closed.

14. The in-vehicle device according to claim 13, further comprising:
an engaging member fixed to the cover and including a through hole or a notch to receive the cover retainer with the cover being closed, wherein
the cover retainer has a shape of a plate extending in a direction away from the housing, and
the engaging member engages with the cover retainer while the cover retainer is inserted in the through hole or the notch of the engaging member.

15. The in-vehicle device according to claim 13, wherein
the first member is fixed to one end of the cover in a longitudinal direction, and
the cover retainer is fixed to the housing at a position to be adjacent to another end of the cover in the longitudinal direction when the cover is closed.

16. The in-vehicle device according to claim 1, wherein the rotational axis extends in a vertical direction.

17. An in-vehicle device, comprising:
a housing having an opening;
an openable and closable cover disposed over the opening;
a first member fixed to the cover to rotate about a rotational axis, the first member comprising (i) a plate-like protruding segment protruding in a direction of the rotational axis and (ii) a plate-like fitting segment fixed to a main surface of the cover; and
a second member fixed to the housing to support the first member such that the first member is rotatable about the rotational axis, the second member comprising a notch around a point of intersection with the rotational axis, the notch being configured to engage with the protruding segment, wherein
an edge of the notch has a first surface and a second surface intersecting with each other,
the second member limits a rotation range of the first member about the rotational axis to a range between a position at which the first member is in contact with the first surface and a position at which the first member is in contact with the second surface,
the first member further comprises a plate-like extending segment adjoining the fitting segment and extending in a direction away from the main surface of the cover, and
the second member abuts on a lower surface in a vertical direction of the extending segment of the first member, thereby supporting the first member.

18. The in-vehicle device according to claim 17, wherein
the first member comprises a metal plate bent along a bending line, and
a portion of the metal plate facing the cover serves as the fitting segment, a portion of the metal plate extending from the fitting segment in the direction of the rotational axis serves as the protruding segment, and a portion of the metal plate protruding from the fitting segment in a direction intersecting the bending line serves as the extending segment.

19. An in-vehicle device, comprising:
a housing having an opening;
an openable and closable cover disposed over the opening;
a first member fixed to the cover to rotate about a rotational axis, the first member comprising (i) a plate-like protruding segment protruding in a direction of the rotational axis and (ii) a plate-like fitting segment fixed to a main surface of the cover;
a second member fixed to the housing to support the first member such that the first member is rotatable about the rotational axis, the second member comprising a notch around a point of intersection with the rotational axis, the notch being configured to engage with the protruding segment; and
a displacement limiter fixed to the housing or the second member to limit displacement of the first member in a direction away from the housing while the cover is open, wherein
an edge of the notch has a first surface and a second surface intersecting with each other, and
the second member limits a rotation range of the first member about the rotational axis to a range between a position at which the first member is in contact with the first surface and a position at which the first member is in contact with the second surface.

20. The in-vehicle device according to claim 19, wherein the first member includes a hole, comprising a through hole, or an opening facing downward in a vertical direction, and in response to maximum rotation of the first member by the rotation range from a position when the cover is closed, the displacement limiter is inserted in the hole and engages with the first member, thereby limiting displacement of the first member in the direction away from the housing.

* * * * *